Nov. 14, 1933.    O. BARNACK    1,935,430

ADJUSTING DEVICE FOR PHOTOGRAPHIC OBJECTIVES

Filed Aug. 15, 1932

INVENTOR
Oskar Barnack
BY
George C. Heinrich
ATTORNEY

Patented Nov. 14, 1933

1,935,430

UNITED STATES PATENT OFFICE 1,935,430

ADJUSTING DEVICE FOR PHOTOGRAPHIC OBJECTIVES

Oskar Barnack, Wetzlar, Germany, assignor to Ernst Leitz, Optische Werke, G. m. b. H., Wetzlar, Germany Application August 15, 1932, Serial No. 628,811, and in Germany August 27, 1931

1 Claim. (Cl. 95—45)

This invention relates to improvements in roll-film cameras, particularly to cameras in which the objective is coupled with a distance meter built into the camera so that the adjustment of the correct distance produces simultaneously the correct focus also.

It is the principal object of my invention to provide a regulating device for the setting of photographic objectives for such cameras avoiding positively all idle movements during the regulating operation.

It will be clear that in order to obtain positively accurate adjustment of the objective by the intermediary of the distance meter, every idle motion must absolutely be avoided.

It is another object of my invention to provide a regulating device for photographic objectives by firmly coupling the regulator ring, directly or indirectly operating a lever of the distance meter, with an annular member carrying the telescoping objective member, so that the photographic objective held within said annular member can be locked within said member in a predetermined position for instance in the infinity position.

If it is desired to adjust the objective to close distances the objective setting plus its ring carrying said setting are adjustable in a worm—or other specially constructed guide.

A further object of my invention is the provision of a regulating device for photographic objectives in which the ring for the operation of the distance meter is arranged concentrically to the optical axis and may have a level, bevelled or curved rim.

It will be clear that the means for locking the objective member within the regulating annulus may have various forms, as for instance a thread and spring action for connecting both rings. This connection may, however, also have the form of a bayonet lock which, however, would evidently not provide such a firm seat for the objective as is desirable, and would allow the adjustment of the objective in the regulator ring within certain restricted limits only.

These and other objects and advantages of my invention will become more fully known as the description thereof proceeds, and will then be more specifically defined in the appended claim.

In the accompanying drawing forming a material part of this disclosure:

Figure 1:
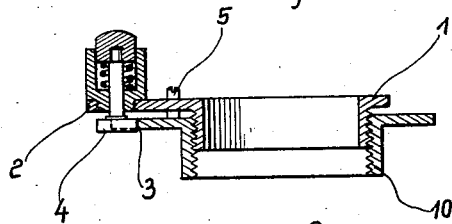
Fig. 1 is a sectional side elevation of a regulating device constructed according to my invention, with its spring expanded.
Figure 2:
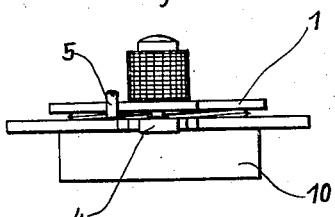
Fig. 2 is an end elevation thereof.
Figure 3:
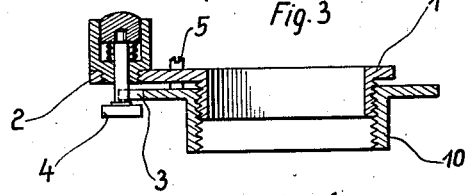
Fig. 3 is a view similar to Figure 1 with the spring tensioned.
Figure 4:
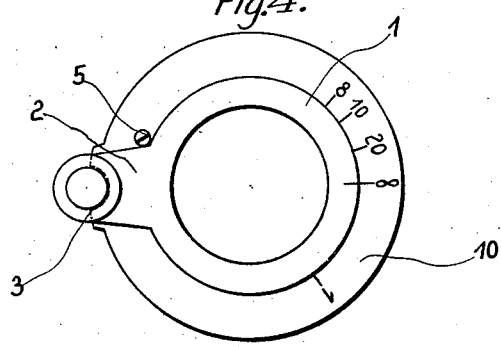
Fig. 4 is a top plan view of an annular member.

As illustrated, in Figures 1 to 4, an annular member 1, for the reception of the photographic objective is equipped with a nose or extension 2, having a chamber in which is arranged a spring adapted to be compressed by means of a pressure pin 4. A chamber 3 is formed within a flange forming part of the ring element 10 in engagement with a distance meter (not shown).

The ring 10 is adapted to receive the annular member 1 and is for this purpose equipped with an inner thread. The ring 10 is either arranged within a suitable sleeve of a photographic roll film camera or is screwed directly into the camera casing or housing. In the latter arrangement the ring must also be equipped with an outer thread or worm. The rear rim of the ring 10 may be level, bevelled, or curved, and contacts directly with the distance meter. A stop 5 limits the objective adjustment in the infinity position.

The operation of my device will be readily understood from the above description and simultaneous reference to the drawing.

It will be understood that I have described and shown the preferred forms of my device as some examples only of the many possible ways to practically construct the same, and that I may make such changes in the general arrangement of the device and in the construction of the minor details thereof as come within the scope of the appended claim without departure from the spirit of my invention and the principles involved.

Having thus described my invention what I claim as new and desire to secure by Letters Patent is:

In a device for locking the objective of a camera in any of its adjusted positions, an annular member for the reception of the objective, a ring seating said member, a chambered extension for said member, a spring in said chamber, a pressure pin carrying a head entering said chamber for compressing said spring upon the outward movement of said pin, and a head on the outer end of said pin, a flange on said ring having a depression for the reception of the pin head, and a stop pin on said ring for limiting the objective adjustment in the infinity position of the objective.

OSKAR BARNACK.